United States Patent
Yagnik et al.

(10) Patent No.: US 9,135,674 B1
(45) Date of Patent: *Sep. 15, 2015

(54) ENDPOINT BASED VIDEO FINGERPRINTING

(71) Applicant: Google Inc., Mountain View, CA (US)

(72) Inventors: Jay Yagnik, Mountain View, CA (US);
Henry Rowley, Sunnyvale, CA (US);
Sergey Ioffe, Mountain View, CA (US)

(73) Assignee: Google Inc., Mountain View, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 14/092,515

(22) Filed: Nov. 27, 2013

Related U.S. Application Data

(63) Continuation of application No. 11/765,292, filed on Jun. 19, 2007, now Pat. No. 8,611,422.

(51) Int. Cl.
*G06F 17/00* (2006.01)
*G06T 1/00* (2006.01)

(52) U.S. Cl.
CPC .................................. *G06T 1/0021* (2013.01)

(58) Field of Classification Search
CPC ............ G06T 1/0021; G06F 17/30784; G06F 17/30787; G06K 9/00744; G06K 9/00758
USPC ............. 375/240.16, 240.01, 240.12, 240.25, 375/240.26
See application file for complete search history.

(56) References Cited

U.S. PATENT DOCUMENTS

| | | | |
|---|---|---|---|
| 5,241,281 A | 8/1993 | Wilkes et al. | |
| 5,600,373 A | 2/1997 | Chui et al. | |
| 5,634,012 A | 5/1997 | Stefik et al. | |
| 5,664,018 A | 9/1997 | Leighton | |
| 5,673,332 A | 9/1997 | Nishikawa et al. | |
| 5,729,662 A | 3/1998 | Rozmus | |

(Continued)

FOREIGN PATENT DOCUMENTS

| | | | |
|---|---|---|---|
| GB | 2369203 A | 5/2002 | |
| GB | 2397904 A | 8/2004 | |

(Continued)

OTHER PUBLICATIONS

A Novel Human Gait Recognition Method by Segmenting and Extracting the Region Variance Feature, Chai et al IEEE, 2006.*

(Continued)

*Primary Examiner* — Luu Pham
*Assistant Examiner* — Jahangir Kabir
(74) *Attorney, Agent, or Firm* — Fenwick & West LLP

(57) ABSTRACT

A method and system generates and compares fingerprints for videos in a video library. The video fingerprints provide a compact representation of the temporal locations of discontinuities in the video that can be used to quickly and efficiently identify video content. Discontinuities can be, for example, shot boundaries in the video frame sequence or silent points in the audio stream. Because the fingerprints are based on structural discontinuity characteristics rather than exact bit sequences, visual content of videos can be effectively compared even when there are small differences between the videos in compression factors, source resolutions, start and stop times, frame rates, and so on. Comparison of video fingerprints can be used, for example, to search for and remove copyright protected videos from a video library. Furthermore, duplicate videos can be detected and discarded in order to preserve storage space.

19 Claims, 8 Drawing Sheets

(56) References Cited

U.S. PATENT DOCUMENTS

| | | | |
|---|---|---|---|
| 5,892,536 | A | 4/1999 | Logan et al. |
| 5,918,223 | A | 6/1999 | Blum et al. |
| 5,987,094 | A | 11/1999 | Clarke et al. |
| 6,005,643 | A | 12/1999 | Morimoto et al. |
| 6,091,822 | A | 7/2000 | Mellows et al. |
| 6,222,807 | B1 | 4/2001 | Min-Jae |
| 6,226,387 | B1 | 5/2001 | Tewfik et al. |
| 6,233,682 | B1 | 5/2001 | Fritsch |
| 6,407,680 | B1 | 6/2002 | Lai et al. |
| 6,693,236 | B1 | 2/2004 | Gould et al. |
| 6,760,536 | B1 | 7/2004 | Amir et al. |
| 6,768,518 | B1 | 7/2004 | Bozdagi |
| 6,778,709 | B1 | 8/2004 | Taubman |
| 6,810,388 | B1 | 10/2004 | Sato |
| 6,871,200 | B2 | 3/2005 | MacQueen et al. |
| 6,889,383 | B1 | 5/2005 | Jarman |
| 6,898,799 | B1 | 5/2005 | Jarman |
| 6,907,075 | B2 | 6/2005 | Felts et al. |
| 6,976,165 | B1 | 12/2005 | Carpentier et al. |
| 6,983,371 | B1 | 1/2006 | Hurtado et al. |
| 7,020,635 | B2 | 3/2006 | Hamilton et al. |
| 7,039,215 | B2 | 5/2006 | Suzaki |
| 7,043,473 | B1 | 5/2006 | Rassool et al. |
| 7,046,855 | B2 | 5/2006 | Sadeh |
| 7,092,953 | B1 | 8/2006 | Haynes |
| 7,099,849 | B1 | 8/2006 | Reeder et al. |
| 7,181,438 | B1 | 2/2007 | Szabo |
| 7,185,200 | B1 | 2/2007 | Levine et al. |
| 7,212,330 | B2 | 5/2007 | Seo et al. |
| 7,277,468 | B2 | 10/2007 | Tian et al. |
| 7,343,025 | B2 | 3/2008 | Seo et al. |
| 7,366,787 | B2 | 4/2008 | Salas et al. |
| 7,369,677 | B2 | 5/2008 | Petrovic et al. |
| 7,370,017 | B1 | 5/2008 | Lindeman et al. |
| 7,409,060 | B2 | 8/2008 | Nomizu et al. |
| 7,415,127 | B2 | 8/2008 | Bodo et al. |
| 7,529,420 | B2 | 5/2009 | Ii |
| 7,653,552 | B2 | 1/2010 | Vaidyanathan et al. |
| 7,680,306 | B2 | 3/2010 | Boutant et al. |
| 7,702,127 | B2 | 4/2010 | Mihcak et al. |
| 7,707,224 | B2 | 4/2010 | Chastagnol et al. |
| 7,724,917 | B2 | 5/2010 | Isogai |
| 7,738,704 | B2 | 6/2010 | Lienhart et al. |
| 7,742,619 | B2 | 6/2010 | Kumar et al. |
| 7,817,861 | B2 | 10/2010 | Lee |
| 7,882,177 | B2 | 2/2011 | Wei et al. |
| 7,903,868 | B2 | 3/2011 | Kim et al. |
| 7,936,824 | B2 | 5/2011 | Lee |
| 8,019,737 | B2 | 9/2011 | Kocsis et al. |
| 8,019,742 | B1 | 9/2011 | Baluja et al. |
| 8,050,454 | B2 | 11/2011 | Yi et al. |
| 8,073,828 | B2 | 12/2011 | Bowden et al. |
| 8,085,995 | B2 | 12/2011 | Yagnik et al. |
| 8,090,624 | B2 | 1/2012 | Reid et al. |
| 8,094,872 | B1 | 1/2012 | Yagnik et al. |
| 8,166,012 | B2 * | 4/2012 | Reddy et al. ................ 707/705 |
| 8,184,953 | B1 * | 5/2012 | Covell et al. ................ 386/248 |
| 2001/0010756 | A1 | 8/2001 | Ogino |
| 2001/0034714 | A1 | 10/2001 | Terao et al. |
| 2001/0046326 | A1 | 11/2001 | Felts et al. |
| 2002/0001413 | A1 | 1/2002 | Ratnakar |
| 2002/0009233 | A1 | 1/2002 | Pesquet-Popescu |
| 2002/0038296 | A1 | 3/2002 | Margolus et al. |
| 2002/0082731 | A1 | 6/2002 | Pitman et al. |
| 2002/0082999 | A1 | 6/2002 | Lee et al. |
| 2002/0087885 | A1 | 7/2002 | Peled et al. |
| 2002/0094135 | A1 | 7/2002 | Caspi et al. |
| 2002/0112171 | A1 | 8/2002 | Ginter et al. |
| 2002/0150164 | A1 | 10/2002 | Felts et al. |
| 2002/0165819 | A1 | 11/2002 | McKnight et al. |
| 2002/0184223 | A1 | 12/2002 | Miura |
| 2003/0004880 | A1 | 1/2003 | Banerjee et al. |
| 2003/0037010 | A1 | 2/2003 | Schmelzer |
| 2003/0046407 | A1 | 3/2003 | Erickson et al. |
| 2003/0061490 | A1 | 3/2003 | Abajian |
| 2003/0068087 | A1 * | 4/2003 | Wu et al. ................ 382/190 |
| 2003/0095660 | A1 | 5/2003 | Lee et al. |
| 2003/0099373 | A1 | 5/2003 | Joo et al. |
| 2003/0123584 | A1 | 7/2003 | Siegel et al. |
| 2003/0202660 | A1 | 10/2003 | Zhou et al. |
| 2004/0003398 | A1 | 1/2004 | Donian et al. |
| 2004/0010602 | A1 | 1/2004 | Van Vleck et al. |
| 2004/0028138 | A1 | 2/2004 | Piche et al. |
| 2004/0030615 | A1 | 2/2004 | Ling |
| 2004/0111628 | A1 | 6/2004 | Inotani et al. |
| 2004/0163106 | A1 | 8/2004 | Schrempp et al. |
| 2004/0170335 | A1 | 9/2004 | Pearlman et al. |
| 2004/0221118 | A1 | 11/2004 | Slater et al. |
| 2005/0008190 | A1 | 1/2005 | Levy et al. |
| 2005/0060542 | A1 | 3/2005 | Risan et al. |
| 2005/0071604 | A1 | 3/2005 | Tanner et al. |
| 2005/0080846 | A1 | 4/2005 | McCleskey et al. |
| 2005/0105801 | A1 | 5/2005 | Periaswamy |
| 2005/0125845 | A1 | 6/2005 | Hardt et al. |
| 2005/0144141 | A1 | 6/2005 | Nagao |
| 2005/0154680 | A1 | 7/2005 | Schmelzer |
| 2005/0154892 | A1 | 7/2005 | Mihcak et al. |
| 2005/0172312 | A1 | 8/2005 | Lienhart et al. |
| 2005/0195975 | A1 | 9/2005 | Kawakita |
| 2005/0213826 | A1 | 9/2005 | Neogi |
| 2005/0216513 | A1 | 9/2005 | Levy |
| 2005/0246752 | A1 | 11/2005 | Liwerant et al. |
| 2006/0031870 | A1 | 2/2006 | Jarman et al. |
| 2006/0034177 | A1 | 2/2006 | Schrempp |
| 2006/0085816 | A1 | 4/2006 | Funk et al. |
| 2006/0088224 | A1 | 4/2006 | Lee |
| 2006/0098872 | A1 | 5/2006 | Seo et al. |
| 2006/0106725 | A1 | 5/2006 | Finley et al. |
| 2006/0110005 | A1 | 5/2006 | Tapson |
| 2006/0110137 | A1 | 5/2006 | Tsuda et al. |
| 2006/0114998 | A1 | 6/2006 | Barrau |
| 2006/0120558 | A1 | 6/2006 | Shi et al. |
| 2006/0167881 | A1 | 7/2006 | Aydar et al. |
| 2006/0177198 | A1 | 8/2006 | Jarman et al. |
| 2006/0187358 | A1 | 8/2006 | Lienhart et al. |
| 2006/0195859 | A1 | 8/2006 | Konig et al. |
| 2006/0195860 | A1 | 8/2006 | Eldering et al. |
| 2006/0206486 | A1 | 9/2006 | Strickland |
| 2006/0212927 | A1 | 9/2006 | Riku et al. |
| 2006/0271947 | A1 * | 11/2006 | Lienhart et al. ................ 725/19 |
| 2006/0287916 | A1 | 12/2006 | Starr et al. |
| 2007/0005556 | A1 | 1/2007 | Ganti |
| 2007/0028308 | A1 | 2/2007 | Nishio et al. |
| 2007/0047816 | A1 | 3/2007 | Graham et al. |
| 2007/0058925 | A1 | 3/2007 | Chiu |
| 2007/0073626 | A1 | 3/2007 | Reeder et al. |
| 2007/0101360 | A1 | 5/2007 | Gutta et al. |
| 2007/0106551 | A1 | 5/2007 | McGucken |
| 2007/0124698 | A1 | 5/2007 | Majumder |
| 2007/0124756 | A1 | 5/2007 | Covell et al. |
| 2007/0130580 | A1 | 6/2007 | Covell et al. |
| 2007/0143219 | A1 | 6/2007 | Shen et al. |
| 2007/0143778 | A1 | 6/2007 | Covell et al. |
| 2007/0156726 | A1 | 7/2007 | Levy |
| 2007/0180537 | A1 * | 8/2007 | He et al. ................ 726/32 |
| 2007/0203911 | A1 | 8/2007 | Chiu |
| 2007/0211174 | A1 | 9/2007 | Putterman et al. |
| 2007/0220575 | A1 | 9/2007 | Cooper et al. |
| 2007/0230739 | A1 | 10/2007 | Johnson et al. |
| 2007/0274571 | A1 | 11/2007 | Hamza |
| 2007/0282472 | A1 | 12/2007 | Seldman |
| 2007/0288518 | A1 | 12/2007 | Crigler et al. |
| 2007/0294175 | A1 | 12/2007 | Thelen |
| 2008/0040147 | A1 | 2/2008 | Kim |
| 2008/0052783 | A1 | 2/2008 | Levy |
| 2008/0059211 | A1 | 3/2008 | Brock et al. |
| 2008/0059425 | A1 | 3/2008 | Brock et al. |
| 2008/0059426 | A1 | 3/2008 | Brock et al. |
| 2008/0059461 | A1 | 3/2008 | Brock et al. |
| 2008/0059536 | A1 | 3/2008 | Brock et al. |
| 2008/0065896 | A1 | 3/2008 | Johnson et al. |
| 2008/0080756 | A1 | 4/2008 | Periaswamy |
| 2008/0080771 | A1 | 4/2008 | Periaswamy |
| 2008/0109306 | A1 | 5/2008 | Maigret et al. |

(56) References Cited

U.S. PATENT DOCUMENTS

| | | |
|---|---|---|
| 2008/0127340 A1 | 5/2008 | Lee |
| 2008/0130944 A1 | 6/2008 | Johnson et al. |
| 2008/0159590 A1 | 7/2008 | Yi et al. |
| 2008/0163288 A1 | 7/2008 | Ghosal et al. |
| 2008/0163378 A1 | 7/2008 | Lee |
| 2008/0172678 A1 | 7/2008 | Lee et al. |
| 2008/0178288 A1 | 7/2008 | Alperovitch et al. |
| 2008/0178302 A1 | 7/2008 | Brock et al. |
| 2008/0256326 A1* | 10/2008 | Patterson et al. ............ 711/206 |
| 2009/0013414 A1 | 1/2009 | Washington et al. |
| 2009/0083228 A1 | 3/2009 | Shatz et al. |
| 2009/0083857 A1 | 3/2009 | Ueno et al. |
| 2009/0125310 A1 | 5/2009 | Lee et al. |
| 2009/0165031 A1 | 6/2009 | Li et al. |
| 2009/0324199 A1 | 12/2009 | Haitsma et al. |
| 2009/0327334 A1 | 12/2009 | Rodriguez et al. |
| 2009/0328125 A1 | 12/2009 | Gits et al. |
| 2009/0328228 A1 | 12/2009 | Schnell |
| 2009/0328237 A1 | 12/2009 | Rodriguez et al. |
| 2010/0082527 A1 | 4/2010 | Jain |
| 2010/0119105 A1 | 5/2010 | Moriya et al. |
| 2010/0125553 A1* | 5/2010 | Huang et al. ................. 707/661 |
| 2010/0182401 A1 | 7/2010 | Yoon et al. |
| 2011/0258049 A1 | 10/2011 | Ramer et al. |
| 2012/0123786 A1 | 5/2012 | Valin et al. |
| 2012/0136793 A1 | 5/2012 | Valin et al. |

FOREIGN PATENT DOCUMENTS

| | | |
|---|---|---|
| JP | 2002-032587 A | 1/2002 |
| JP | 2003-242281 | 8/2003 |
| JP | 2003-242372 A | 8/2003 |
| JP | 2006-072651 A | 3/2006 |
| WO | WO-02/11033 A1 | 2/2002 |
| WO | WO 02/082271 A1 | 10/2002 |
| WO | WO-02/103968 A1 | 12/2002 |
| WO | WO 03/046761 A2 | 6/2003 |
| WO | WO-2005/060424 A3 | 7/2005 |
| WO | WO-2006/007449 A3 | 1/2006 |
| WO | WO 2006/015168 A2 | 2/2006 |
| WO | WO-2006/077551 A3 | 7/2006 |
| WO | WO-2007/033358 A2 | 3/2007 |
| WO | WO-2007/076459 | 7/2007 |

OTHER PUBLICATIONS

Video Indexing by Face Occurrence-Based Signatures, Cotsaces et al IEEE, 2006.*

Shumeet Baluja et al., *Audio Fingerprinting: Combining Computer Vision & Data Stream Processing*, IEEE International Conference on Acoustics, Speech and Signal Processing (ICASSP 2007), Apr. 15-20, 2007, pp. 11-213-11-216, vol. 2.

Shumeet Baluja et al., *Content Fingerprinting Using Wavelets*, 3rd European Conference on Visual Media Production, 2006, pp. 198-207.

Ondrej Chum et al., *Scalable Near Identical Image and Shot Detection*, Conference on Image and Audio Video Retrieval, Proceedings of the 6th ACM International Conference on Image and Video Retrieval, 2007, pp. 549-556, ACM. N.Y., USA.

Edith Cohen et al., *Finding Interesting Associations without Support Pruning*, IEEE Transactions on Knowledge and Data Engineering, 2001, pp. 64-78, vol. 13, Issue 1.

Michele Covell et al., *Known-Audio Detection Using Waveprint: Spectrogram Fingerprinting by Wavelet Hashing*, International Conference on Acoustics, Speech and Signal Processing (ICASSP-2007), 2007.

Charles E. Jacobs et al., *Fast Multiresolution Image Querying*, International Conference on Computer Graphics and Interactive Techniques, Proceedings of the 22nd Annual Conference on Computer Graphics and Interactive Techniques, 1995, pp. 277-286, ACM, U.S.A.

Ting Liu et al., *Clustering Billions of Images with Large Scale Nearest Neighbor Search*, 8th IEEE Workshop on Application of Computer Vision (WACV'07). Feb. 2007, pp. 28-34, U.S.A.

Pierre Moulin et al., *Performance of Random Fingerprinting Codes Under Arbitrary Nonlinear Attacks*, IEEE International Conference on Acoustics Speech and Signal Processing, Apr. 2007, pp. II-157-II-160, vol. 2, Issue 15-20.

Ashwin Swaminathan et al., *Robust and Secure Image Hashing*, IEEE Transactions on Information Forensics and Security, Jun. 2006, pp. 215-230, vol. 1, No. 2.

Definition of "Publisher", The Penguin English Dictionary, 2007, Credo Reference, 1 page, [online] [retrieved on Jul. 31, 2010] Retrieved from the internet URL:http://www.xreferplus.com/entry/penguineng/publisher>.

U.S. Appl. No. 12/536,907, filed Aug. 6, 2009, 51 pages.
U.S. Appl. No. 12/569,827, filed Sep. 29, 2009, 56 pages.
U.S. Appl. No. 12/042,138, filed Mar. 4, 2008, 38 pages.
U.S. Appl. No. 12/237,397, filed Sep. 25, 2008, 34 pages.
U.S. Appl. No. 12/697,880, filed Feb. 1, 2010, 32 pages.
Office Action for U.S. Appl. No. 11/765,292, Oct. 25, 2012, 23 Pages.
Office Action for U.S. Appl. No. 11/765,292, Dec. 9, 2011, 21 Pages.
Examination Report for Australian Patent Application No. AU 2012201652, Oct. 3, 2013, 4 Pages.
Examiner's first report on Australian patent application No. AU 2007316477, mailed Jul. 4, 2011, 4 pages.
Examiner's first report on Australian patent application No. AU 2011201035, mailed Aug. 16, 2011, 1 pages.
Patent Examination Report No. 1 for Australian Patent Application No. 2008247347, Mar. 26, 2012, 3 Pages.
Patent Examination Report No. 2 for Australian Patent Application No. 2008247347, Mar. 22, 2013, 5 Pages.
First Office Action for Canadian Patent Application No. 2,667,782, May 7, 2012, 3 pages.
Office Action for Canadian Patent Application No. CA 2,685,870 mailed Mar. 14, 2012, 3 Pages.
First Office Action for Chinese Patent Application No. CN 200780046460.6, mailed Apr. 13, 2012, 21 Pages.
Third Office Action for Chinese Patent Application No. CN 200780046460.6, Nov. 20, 2013, 6 Pages.
Second Office Action for Chinese Patent Application No. CN 200780046460.6, Mar. 15, 2013, 6 Pages.
First Office Action mailed on Jul. 27, 2011, for Chinese Patent Application No. CN 200880020501.9, 11 Pages.
Chinese Second Office Action, Chinese Application No. 200880020501.9, May 31, 2012, 13 pages.
Third Office Action for Chinese Patent Application No. CN 200880020501.9, Jul. 2, 2013, 11 Pages.
European Search Report for European Patent Application No. EP 10187030, Dec. 15, 2010, 12 pages.
Communication pursuant to Article 94(3) EPC for European Patent Application No. EP 10187030.1, Apr. 24, 2013, 6 Pages.
Supplementary European Search Report for European Patent Application No. EP 08737515, Dec. 13, 2010, 12 pages.
Communication pursuant to Article 94(3) EPC for European Patent Application No. EP 08737515, Mar. 5, 2013, 7 Pages.
Extended Search Report for European Patent Application No. EP 07854581.1, May 31, 2013, 6 pages.
Supplementary European Search Report for European Patent Application No. EP 08780597 mailed Mar. 30, 2012, 10 Pages.
Communication pursuant to Article 94(3) EPC for European Patent Application No. 08780597.4, Jun. 11, 2013, 9 Pages.
Notice from European Patent Office Dated Oct. 1, 2007 concerning business methods, Official Journal EPO, Nov. 2007, pp. 592-593.
Notice of Grounds for Rejection for Japanese Patent Application No. P2009-535496 mailed Feb. 28, 2012, 13 Pages.
Office Action for Japanese Patent Application No. P2009-535496, Mailed Sep. 24, 2013, 6 pages.
Decision of Rejection for Japanese Patent Application No. JP 2009-535496, Mar. 5, 2013, 6 Pages.
Japanese Office Action, Japanese Application No. 2010-506717, Sep. 25, 2012, 8 pages.
PCT International Search Report and Written Opinion, PCT/US2007/083677, May 14, 2008, 7 pages.
PCT International Search Report and Written Opinion, PCT/IB2008/000997, Aug. 3, 2009, 7 Pages.

(56) References Cited

OTHER PUBLICATIONS

PCT International Search Report and Written Opinion, PCT/US2008/062713, Oct. 6, 2008, 13 pages.
Combined Search and Examination Report, UK Patent Application No. GB0805603.8, Jul. 17, 2008, 4 pages.
Achul B; Bhandari A; Method of sharing revenue in online advertising system, involves involking automated revenue sharing between host and publisher based on revenue sharing arrangement; Apr. 9, 2009; Thomson Reuters; Dec. 5, 2011 (Item 11 from file:350), 1 Page.
"Altnet Launches Global File Registry," P2P File Sharing, The Insider's Edition, Aug. 2003, 4 pages, [online][retrieved on Mar. 14, 2012] Retrieved from the internet <URL:http://www.p2p-weblog.com/50226711/altnet_launches_global_file_registry.php>.
Baluja, S., et al., Content Fingerprinting Using Wavelets, 3rd European Conference on Visual Media Production, 2006, pp. 198-207.
Chastagnol F; Computer implemented content provider admitting method for content hosting website, involves inviting content provider into revenue sharing partner program responsive to determination made whether to invite provider into program; Nov. 6, 2008; Thomson Reuters; May 1, 2014 (Item 1 from file: 350), 1 Page.
Gao Y; Liut; Liu Z; Wang P; Method for upgrading internet protoco business operating model for development of triple-network convergence, involves developing internet protocol TV operational control based on model of triple-network convergence; Nov. 2, 2012; Thomas Reuters; May 1, 2014 (Item 1 from file:350), 1 Page.
Gargi, U., et al., "Solving the Label Resolution Problem with Supervised Video" MIR'08, Oct. 30-31, 2008, ACM, pp. 276-282.
IT Media, Inc., "YouTube tied up with CBS, SONY BMG and UMG", ITmedia News, ITmedia Kabushikikaisha, Japan, Oct. 10, 2006, 3 pages, can be retrieved at <URL: http://www.itmedia.co.jp/news/articles/0610/10news063.html>.
Jacobs, C., et al., "Fast Multiresolution Image Querying," ACM 1995, pp. 277-286.
Kishigami, J., et al., "Trend on Content Business," Report of Institute of Information Processing's Research, Institute of Information Processing, Nov. 19, 1999, pp. 37-42, vol. 99, No. 94 (With English Abstract).
Meyer, F.G., "Fast Adaptive Wavelet Packet Image Compression," IEEE Transactions on Image Processing, Apr. 1998, pp. 1-31.
Muhsen, Z. et al., "Wavelet and Optimal Requantization Methodology for Lossy Fingerprint Compression," The International Arab Journal of Information Technology, Oct. 2011, pp. 383-387, vol. 8, No. 4.
Paris, J., et al., "Low Bit Rate Software Only Wavelet Video Coding" IEEE (1997) pp. 169-174.
Sarkar, A., et al. "Video Fingerprinting: Features for Duplicate and Similar Video Detection and Query-based Video Retrieval" CitSeerX, Jan. 2008, vol. 6820, pp. 1-12.
Sumbera, J., et al. "Wavelet Transform using Haar Wavelets" MSOE CS-4802 Final Project Feb. 12, 2001, pp. 1-20.
"Technical White Paper," Global File Registry, May 26, 2006, 20 Pages, [online][retrieved on Mar. 14, 2012] Retrieved from the internet <URL:http://www.globalfileregistry.com/assets/Global_File_Registry_White_Paper.pdf>.
Toderici, G., et al., "Automatic, Efficient, Temporally Coherent Video Enhancement for Large Scale Applications" MM'09, Oct. 19-24, 2009 pp. 609-612.
Yagnik, J., et al., "A Model Based Factorization Approach for dense 3D recovery from Monocular Video" Proc. of the Seventh IEEE International Symposium of Multimedia, 2005, pp. 1-4.
Yagnik, J., et al., "Learning People Annotation from the Web via Consistency Learning" MIR'07, Sep. 28-29, 2007, ACM, pp. 285-290.
"Cabinet Office Employing Punishment Against Unfair Acts Involved in Study Activities Using Competitive Study Funds, Such as Return of the Funds and Limitation of Applicant Eligibility," Chemical Industry Daily Report, Nov. 20, 2006, p. 10.
Metacafe, "Metacafe Help Blog: Metacafe's Producer Rewards® Program," Date unknown, [online] [Retrieved on Aug. 11, 2008] Retrieved from internet URL:http://help.metacafe.com/?page_id=241, 7 pages.
Revver, "Revver Video Sharing Network," 2008, [online] [Retrieved on Aug. 11, 2008] Retrieved from the internet URL:http://www.revver.com/go/faq/, 16 pages.
"Dailymotion brings content to the US (MotionMaker program)", Online Reporter, Jul. 14, 2007, p. 548, vol. 14 No. 1, [Retrieved from Dialog], 2 pages.
"France—SFR boosts mobile content line-up," Tarifica Alert, Jul. 24, 2007, Phillips Business Information, [Retrieved from Dialog], 2 pages.
"Wizzard Signs on to Dailymotion's MotionMaker Program," Wireless News, Dec. 30, 2007, [Retrieved from Dialog], 1 page.
"Wizzard Joins Dailymotion's MotionMaker Program," Wireless News, Dec. 19, 2007, [Retrieved from Dialog], 1 page.
"Wizzard Partners with Dailymotion as Premium Content Provider," Wireless News, Dec. 13, 2007, [Retrieved from Dialog], 1 page.
"Dailymotion, Skype partner to launch 'Mood Channels'," Online Reporter, Aug. 11, 2007, p. 552, vol. 30, No. 1, [Retrieved from Dialog], 1 page.
"Dailymotion Reports Global Implementation of Ina's Video Fingerprinting System," Wireless News, Oct. 21, 2007, [Retrieved from Dialog], 1 page.
Sweetow, S., "YouTube generation: creating viral videos via user-generated content sites," EventDV, Jul. 2007, 20, 7, 28(6), [Retrieved from Dialog], 6 pages.
Cohen, E., "Dailymotion Launches Largest Independent Online Video Entertainment Site in the US; Dailymotion recruits executive team from MTV Networks and Time Warner to lead US and international efforts; team brings programming and management experience to Dailymotion. Dailymotion's programming team creates site specifi-cally tailored to US audience," Dailymotion, Business Wire, Jul. 11, 2007, 2 Pages.
"Archive pour Jan. 2007," Dailymotion the blog, Jan. 2007, [online] [Retrieved on Dec. 16, 2009] Retrieved from the internet URL:http://blog.dailymotion.com/2007/01/, 3 pages.
Terms of Use for Motion Maker Program, 2 pages, www.dailymotion.com [Archived on Feb. 12, 2007] [online] [Retrieved on Dec. 16, 2009] Retrieved from the Internet <URL:http://web.archive.org/web/20070212154953/http://www.dailymotion.com/register/motionmaker>.
FAQ, for www.dailymotion.com, [Archived on Feb. 2, 2007] [online] [Retrieved on Dec. 16, 2009] Retrieved from the Internet <URL:http://web.archive.org/web/*/http://www.dailymotion.com/faq>, 5 pages.
Producer Rewards Update, posted on Nov. 15, 2006, on http://blog.metacafe.com, 1 page.
Supplemental Notice of Allowance for U.S. Appl. No. 12/115,512 mailed Apr. 21, 2014, 50 Pages.
Notice of Allowance for U.S. Appl. No. 12/115,512 mailed Mar. 21, 2014, 46 Pages.

\* cited by examiner

ENDPOINT BASED VIDEO FINGERPRINTING

RELATED APPLICATIONS

This application is a continuation of U.S. patent application Ser. No. 11/765,292 entitled "Endpoint Based Video Fingerprinting" filed on Jun. 19, 2007 to Jay Yagnik, Henry Rowley, and Sergey Ioffe, the content of which is incorporated by reference herein.

BACKGROUND

1. Field of Art

The invention generally relates to video processing, and more specifically to video fingerprinting.

2. Description of the Related Art

Electronic video libraries may contain thousands or millions of video files, making management of these libraries an extremely challenging task. The challenges become particularly significant in the case of online video sharing sites where many users can freely upload video content. In some cases, users upload unauthorized copies of copyrighted video content, and as such, video hosting sites need a mechanism for identifying and removing these unauthorized copies. While some files may be identified by file name or other information provided by the user, this identification information may be incorrect or insufficient to correctly identify the video. An alternate approach of using humans to manually identifying video content is expensive and time consuming.

Another problem faced by video sharing sites is that users may upload multiple copies of video content to the site. For example, popular items such as music videos may be uploaded many times by multiple users. This wastes storage space and becomes a significant expense to the host. A third problem is that due to the large number of files, it is very difficult to organize the video library based on video content. Thus, search results may have multiple copies of the same or very similar videos making the results difficult to navigate for a user.

Various methods have been used to automatically detect similarities between video files based on their video content. In the past, various identification techniques (such as an MD5 hash on the video file) have been used to identify exact copies of video files. Generally, a digital "fingerprint" is generated by applying a hash-based fingerprint function to a bit sequence of the video file; this generates a fixed-length monolithic bit pattern—the fingerprint—that uniquely identifies the file based on the input bit sequence. Then, fingerprints for files are compared in order to detect exact bit-for-bit matches between files. Alternatively, instead of computing a fingerprint for the whole video file, a fingerprint can be computed for only the first frame of video, or for a subset of video frames. However, each of these methods often fail to identify videos uploaded by different users with small variations that change the exact bit sequences of the video files. For example, videos may be uploaded from different sources and may vary slightly in how they are compressed and decompressed. Furthermore, different videos may have different source resolutions, start and stop times, frame rates, and so on, any of which will change the exact bit sequence of the file, and thereby prevent them from being identified as a copy of an existing file.

Other attempts to solve the described problems have involved applying techniques related to finding duplicate images. In these techniques individual frames of the video are treated as separate and independent images. Image transforms are performed to extract information representing spatial characteristics of the images that are then compared. However, there are two main weaknesses in this technique when trying to handle video. First, video typically contains an enormous number of image frames. A library may easily contain thousands or millions of videos, each having frame rates of 15 to 30 frames per second or more, and each averaging several minutes in length. Second, directly applying image matching techniques to video ignores important sequential information present in video. This time information is extremely valuable in both improving detection of duplicates and reducing the amount of data that needs to be processed to a manageable quantity, but is presently ignored by most techniques.

In view of the problems described above, an improved technique is needed for finding similarities between videos and detecting duplicate content based on the perceived visual content of the video. In addition, a technique is needed for comparing videos that is unaffected by small differences in compression factors, source resolutions, start and stop times, frame rates, and so on. Furthermore, the technique should be able to compare and match videos automatically without relying on manual classification by humans.

SUMMARY

A method and system generates and compares fingerprints for videos in a video library using fingerprints that represent the discontinuity structure of the video, according to the locations of discontinuities in the video frame sequence, the audio stream, or both. A discontinuity is, for example, a shot boundary indicating a discontinuity in the stream of captured video (e.g., a cut, fade, or dissolve transition), or a silent point indicating a temporal location where the audio volume drops below a predetermined value or percentile. The methods for generating video fingerprints provide a compact representation of the structural characteristics of the video that can be used to quickly and efficiently identify video content. The methods also allow for comparing videos by using their fingerprints in order to find a particular video with matching content (such as, for example, to find and remove copyright protected videos or to find and remove duplicates). In addition, the methods enable organizing and/or indexing a video library based on their visual content by using video fingerprints. This can provide improved display of search results by grouping videos with matching content.

A video fingerprint is generated by determining endpoint frames in the video frame sequence corresponding to discontinuities in the video and encoding the discontinuity information. The discontinuities can be shot boundaries, scene changes, periods of audio silence, or other visual or auditory discontinuities. Because the fingerprint is based on the structural discontinuity characteristics of the video rather than an exact bit sequence, video content can be effectively compared even when videos have variations in compression factors, source resolutions, start and stop times, frame rates, and so on. A set of fingerprints associated with different segments of a video provide a fingerprint sequence for the video.

The set of video fingerprints for a received video can be compared against reference fingerprints for videos stored in a reference database. In this manner, matching videos can be efficiently located. This is useful for at least two reasons. First, when a video is uploaded to a file sharing site, it may be immediately checked against all videos in the library. If matches are found, the video can be properly indexed in order to eliminate presentation of duplicates in search results. Alternatively, it may be desirable to discard the uploaded video if any matches are found and only accept new entries to the library that are unique. Second, if a video is known to be copyright protected, its fingerprint can be used to efficiently search for visually identical videos in the library so that copyrighted material can be removed.

A system for detecting duplicate video content includes an ingest server, a fingerprinting module, an indexing module, a matching module, and a reference database. The ingest server receives an input video from a video source and provides the video to the fingerprinting module, which generates a fingerprint sequence for the ingest video. Each fingerprint in the fingerprint sequence is indexed by the indexing module according to one or more hash processes which selectively reduce the dimensionality of the fingerprint data. A matching module compares fingerprints and/or fingerprint sequences in the reference database to the fingerprint sequence associated with the ingest video and determines if a match is found. The matching module may be used both to locate particular video content from a query and to organize video search results based on their content.

Fingerprints can be generated using various techniques that capture discontinuity information for a received video. In one described embodiment, a system for generating a video fingerprint sequence includes a normalization module, an endpoint detection module, an encoding module, and a segmenting module. The normalization module converts received videos to a standard format for fingerprinting. The endpoint detection module detects the locations of discontinuities in the sequence of video frames and/or the audio stream. Using this information, an encoding module generates a representation, such as a bit vector in which each bit (or set of bits) represents a frame and the values of the bits distinguish between frames that are associated with a discontinuity ("endpoint frames") and frames that are not. According to various embodiments, the encoding module can also encode the data to distinguish between different types of discontinuities. The segmenting module segments the encoded data into a number of smaller bit sequences that can overlap each other by some number of bits. Each separate bit sequence is a fingerprint representing the structural characteristics of a corresponding segment of video. A fingerprint sequence for the video is formed from the ordered set of fingerprints corresponding to the ordered video segments.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
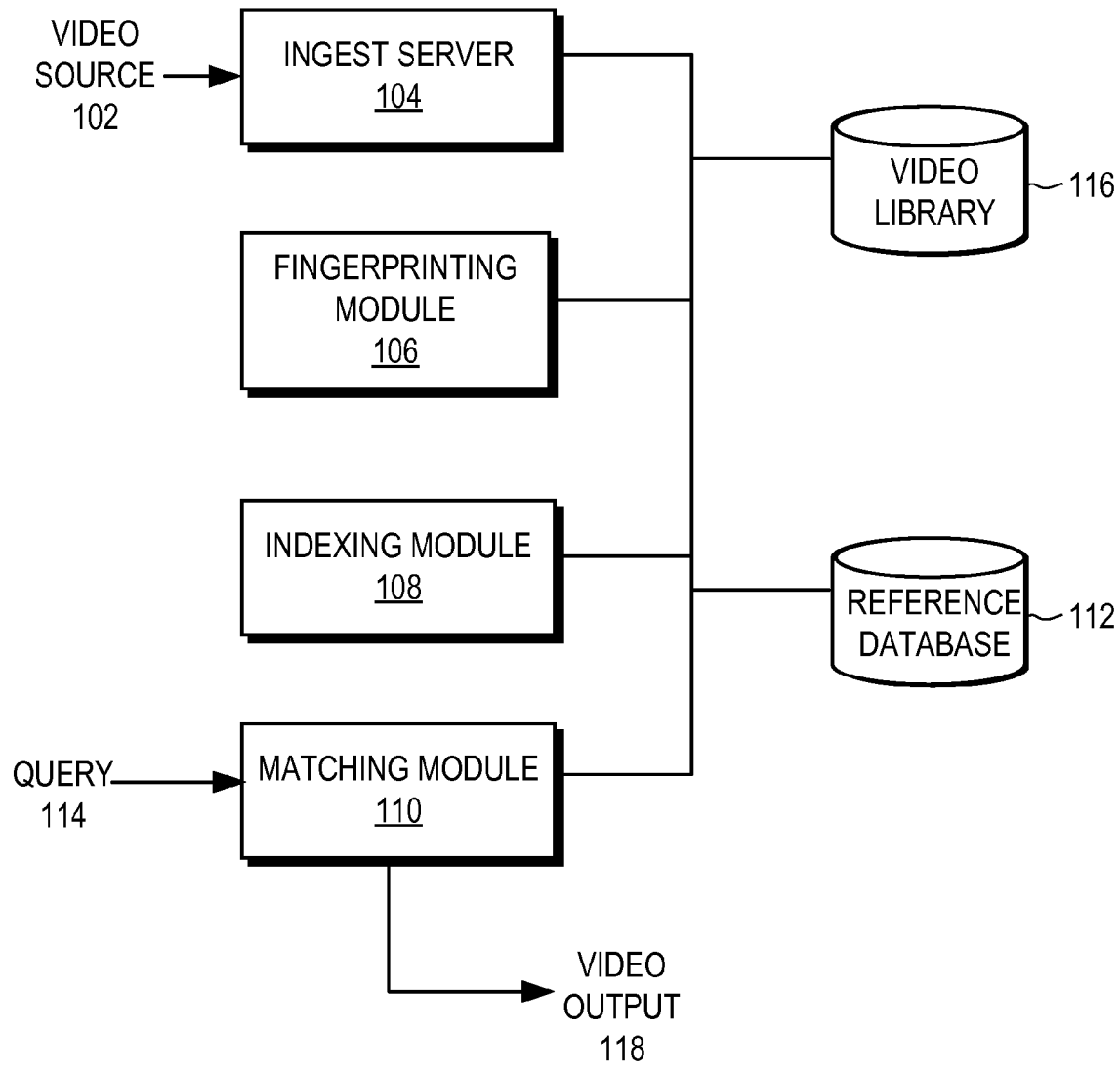
FIG. 1 is a high level block diagram illustrating a system for comparing video content in video library.

FIG. 1 is a high-level block diagram illustrating a system for comparing video content. The system comprises an ingest server 104, a fingerprinting module 106, an indexing module 108, a matching module 110, a reference database 112, and a video library 116. In alternative configurations, different or additional modules may be used.

The ingest server 104 is adapted to receive one or more videos from a video source 102. The video source 102 can be, for example, a client computer coupled to the ingest server 104 through a network. In this configuration, a user can upload video content to the ingest server 104 from a remote location. Alternatively, the video source 102 can be a database or other storage device coupled to the ingest server 104. For example, the video source 102 can be a video storage medium such as a DVD, CD-ROM, Digital Video Recorder (DVR), hard drive, Flash memory, or other memory. The ingest server 104 may also be coupled directly to a video capture system such as a video camera.

The ingest server 104 stores the received videos to the video library 116. The ingest server 104 can also pass received videos directly to the fingerprinting module 106 for fingerprinting immediately upon receipt. The ingest server 104 pre-processes the received video to convert it to a standard format for storage in the video library 116. For example, the ingest server 104 can convert the frame rate, frame size, and color depth of a received video to predetermined formats. For example, storage format can be Adobe FLASH®, with a frame size of 320×240 at 15 fps, and 8 bit color.

The fingerprinting module 106 receives a video from the ingest server 104 or from the video library 116 and generates a sequence of fingerprints associated with the video. Each fingerprint compactly represents the discontinuity structure of the video by determining locations of discontinuities within the video; the discontinuities can be, for example, shot boundaries within the sequence of video frames and/or silent points in the audio stream. This structural discontinuity information is encoded to a bit vector that is divided into multiple overlapping bit sequences. Each bit sequence is a fingerprint corresponding to a particular set of frames that make up a segment of video. The fingerprint uniquely identifies a video segment based on its structure such that minor variations due to compression, de-compression, noise, frame rate, start and stop time, source resolutions and so on do not significantly affect the fingerprint corresponding to each video segment. The complete ordered set of video fingerprints for the segments of a video provides a fingerprint sequence for the video.

The indexing module 108 receives the video fingerprint sequences for each video from fingerprinting module 106 and indexes the fingerprint sequences into the reference database 112. The indexing process can use a variety of different hash techniques to generate a signature for a fingerprint that uniquely identifies the fingerprint while fixing the size of the fingerprint data. The signature is broken into signature blocks and indexed in hash tables. Indexing beneficially reduces the number of bit comparisons needed to compare two fingerprints. Thus, searches for matching fingerprints can be accelerated relative to direct bit-for-bit comparisons of fingerprints.

The matching module 110 compares videos or video segments and generates a matching score indicating the likelihood of a match. The matching module 110 compares the fingerprint sequence of an ingest video to reference fingerprint sequences stored in the reference database 112. Alternatively, the matching module 110 compares fingerprint sequences in the reference database 112 corresponding to two or more videos stored in video library 116. The matching module 110 may further receive a search query from a user requesting particular content and output a video 118 from the video library 116 that matches the query 114.

The video library 116 is a storage device for storing a library of videos. The video library 116 may be any device capable of storing data, such as, for example, a file server, a hard drive, a writeable compact disk (CD) or DVD, or a solid-state memory device. Videos in the video library 116 are generally received from the ingest server 104 and can be outputted to the fingerprinting module 106 for fingerprinting. Videos are also outputted 118 by the matching module 110 that are relevant to a search query 114.

The reference database 112 stores the indexed fingerprints for each video in the video library 116. Each entry in the reference database 112 corresponds to signature blocks generated in the indexing process. Each entry is mapped to unique identifiers of the video segments corresponding to each signature block. The reference database 112 can be searched by the matching module 110 to quickly compare fingerprints and/or fingerprint sequences.

The described system can implement several usage scenarios. A first scenario enables the system to query-by-video to find identical or similar videos to a selected video. Here, a system operator provides an input query 114 to the matching module 110. The input query 114 is in the form of a video having particular content of interest such as, for example, video content that is copyright protected. A fingerprint sequence is generated for the copyright protected video and the reference database 112 is searched for matching fingerprints. Unauthorized copies can then be removed from the video library 116 (or otherwise processed) if the matching module 110 detects a match. In addition, new uploads can be automatically screened for unauthorized copies of known copyrighted works. Here, a newly uploaded video is fingerprinted and the fingerprint sequence is compared against fingerprint sequences for the known copyrighted videos. Then, matching uploads are blocked from storage in the video library 116. In one embodiment, the video can be processed in pieces as it is received so that so that the full video need not be received before processing begins.

In a second scenario, the system is used to detect and remove multiple copies of video content from the video library 116. Duplicate or near duplicate videos may be found within the video library 116, or new videos uploaded by the ingest server 104 may be automatically compared against videos in the video library 116. Duplicate videos found in the video library 116 are removed in order to save storage space. In one embodiment, if a new video is received that already has a duplicate in the video library 116, the new video is simply discarded.

In another scenario, the system can be used to provide organized search results of videos. In this scenario, a user provides an input query 114 and the matching module 110 returns relevant video results. The input query 114 can be in the form a conventional text-based search query or can be in the form of a video file as described previously. Using their fingerprint sequences, video results are compared to one another by the matching module 110 and matching videos are grouped together in the search results.

Figure 2:
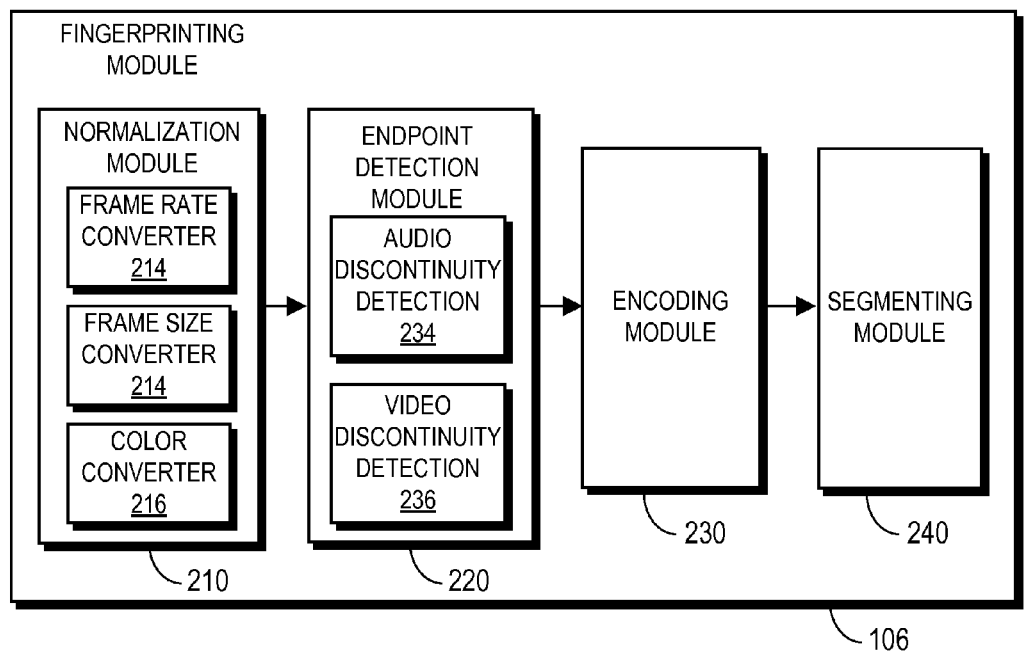
FIG. 2 is a block diagram illustrating an architecture for generating a video fingerprint.

Referring now to FIG. 2, an embodiment of a fingerprinting module 106 for generating fingerprints of a received video is illustrated. The fingerprinting module 106 is adapted to receive an input video that has been pre-processed by the ingest server 104, and generate one or more fingerprints representing structural discontinuity characteristics associated with the video. The fingerprinting module 106 comprises a normalization module 210, an endpoint detection module 220, an encoding module 230, and a segmenting module 240. In alternative configurations, the fingerprinting module 106 can have additional or different modules than those illustrated.

Figure 3:
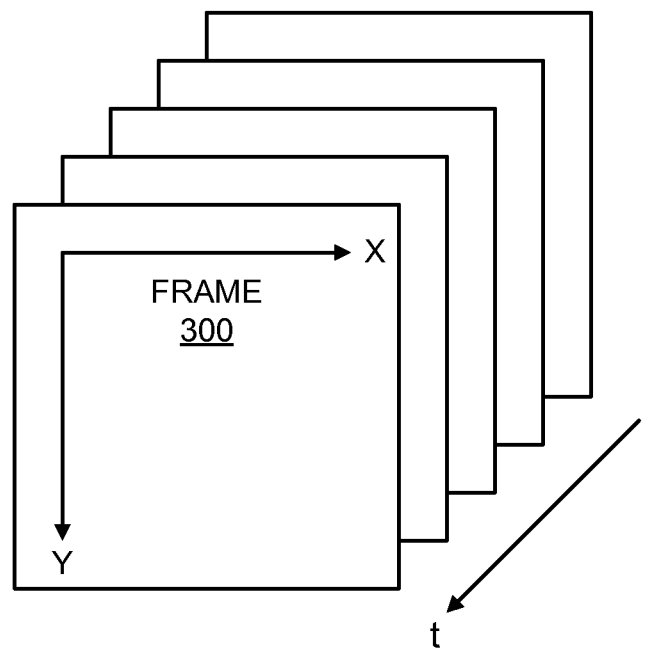
FIG. 3 is a diagram illustrating a video structure as a series of frames.

An example structure for a video received by the fingerprinting module 106 is provided in FIG. 3. The video comprises a series of frames 300. Each frame 300 comprises an image having a plurality of pixels arranged in a two-dimensional grid (for example, in an X direction and a Y direction). The frames 300 are also arranged sequentially in time (the t direction). Thus, a video comprises both spatial information, defined by the arrangement of pixels in the X and Y directions, and sequential or temporal information defined by how the pixels change throughout the time (t) dimension.

Turning back to FIG. 2, the normalization module 210 generally standardizes the data to be processed during fingerprinting. The normalization module 210 includes a frame rate converter 212, a frame size converter 214 and color converter 216 to normalize video to a predetermined format for fingerprinting. Converting video to a standardized fingerprint format ensures that videos are consistent and can produce comparable results. Often, frame rate, frame size, and color information are reduced by the normalization module 210 in order to improve the speed and power efficiency of the fingerprinting process. For example, the normalization module 210 can convert the video to luminance (grayscale) values without color, reduce the frame rate to 15 fps, and reduce the frame size to 64×64. Each of the standard formats used by the normalization module 210 may be predetermined or may be determined dynamically based on various constraints such as, for example, available power, available bandwidth, or characteristics of the received video.

The endpoint detection module 220 operates on the normalized video obtained from the normalization module 210. An endpoint is a frame corresponding to the temporal location of a discontinuity. The endpoint detection module 220 comprises an audio discontinuity detection module 234 and a video discontinuity detection module 236. The audio discontinuity detection module 234 and the video discontinuity detection module 236 can process the normalized video in either order or can process in parallel.

The video discontinuity detection module 236 analyzes the sequential characteristics of the video frame sequence to determine temporal locations of discontinuities in the frame sequence. A video discontinuity can be, for example, a boundary in between shots of video. As used herein, a "shot" refers to an uninterrupted sequence of video frames from one camera. A "shot boundary" then is a frame at the point of transition between two different shots. A shot boundary can be, for example, an abrupt change such as when a video scene switches from one camera angle to another (i.e. a cut), a fade in which the shot slowly fades to black and a new shot begins, a dissolve in which a first shot slowly transitions into a second shot, or any other type of transition.

In one embodiment, the video discontinuity detection module 236 performs a motion analysis to estimate the relative motion of pixels between frames. Frames corresponding to the temporal locations in the video where motion is highest are determined to be the shot boundaries. Various other techniques for detecting shot boundaries are well known in the art. In some techniques, the type of shot boundary can also be detected to distinguish between, for example, a cut, fade, dissolve, or other types of shot boundaries.

The audio discontinuity detection module 234 analyzes audio characteristics of the audio track associated with the video to determine discontinuities in the audio stream. An audio discontinuity can be, for example, a silent point in the audio. A silent point, as defined in one embodiment, is a temporal location in the audio stream at which the audio volume over some predefined number of frames (or number of seconds) is below a predetermined threshold volume or a below a predetermined percentile of the volume in surrounding frames. Silent points often coincide with shot boundaries, although this is not always the case. For example, a silent point could be defined at a location in the audio stream where the volume is less than 20 db for at least 3 seconds (or equivalent number of frames).

It is noted that depending on the types of discontinuity detection used by the endpoint detection module 220, the described techniques can also be applied to other types of media files that do not necessarily have both a frame sequence and an audio track. For example, an embodiment that uses only audio discontinuity detection could be applied to an pure audio file that is not necessarily associated with a video frame sequence. Similarly, another embodiment that uses only video discontinuity detection could be applied to a frame sequence that does not necessarily have an associated audio track.

The locations of discontinuities in a video and/or audio streams provide structural information that is generally unaffected by the presence of variations in compression factors, source resolutions, start and stop times, frame rates, and so on. The temporal locations of discontinuities are outputted by the endpoint detection module 220 and used to construct a video fingerprint sequence representing unique structural characteristics of a video.

An encoding module 230 encodes the discontinuity information into a data representation of the structural discontinuity characteristics of a video. Various data representation schemes can be used. In one embodiment, the encoding module 230 uses a bit vector, in which the bit sequence represents the corresponding frame sequence, and indicates for each frame whether or not any type of discontinuity exists (e.g., a bit value of 1 indicates a discontinuity at the frame (an endpoint frame), while value of 0 indicates the frame is not an endpoint). In this embodiment, the representation provides a one-to-one mapping between a bit and a frame of video. Alternatively, multiple bits can be used per frame where different values represent different types of endpoint frames. For example, two bits can be used for each frame, with one bit indicating whether the frame is an endpoint, and the second bit indicating either an audio or video discontinuity. In another example, different encodings schemes can be used to also distinguish between more specific types of boundaries (e.g., cut, fade, dissolve, etc.). In yet another embodiment, the encoding module 230 quantizes the representation in time so that a single bit represents several frames of video. Here, for example, a bit value of 1 indicates that a discontinuity is present in the several frames of video and a bit value of 0 indicates no discontinuity is present in the several frames represented by the bit value.

Other types of encodings can be used that do not use a fixed number of bits to directly represent a fixed number of frames. For example, in one configuration, the encoding module 230 represents the discontinuity structure of the video by encoding a sequence of time offsets to the next endpoint frame. For example, an encoding of 500 200, 300 . . . indicates that there are 500 frames from the starting point to the first endpoint, 200 frames to the next endpoint, 300 frames to the next endpoint and so on.

The segmenting module 240 segments the encoded data into a number of fingerprints. Each fingerprint is a subset of the encoded data corresponding to the discontinuity information for a segment of the video. Segmenting can be performed in a variety of ways. In a first embodiment, the segmenting module segments the encoded data representation into fingerprints that overlap by a fixed number of frames. If the offset between fingerprints is, for example, a single frame then a fingerprint is obtained corresponding to each possible starting position of the video. In alternative configurations, a different offset between fingerprints can be used.

In a second embodiment, the number of frames represented by each fingerprint and the offset between fingerprints is varied rather than constant. For example, in one embodiment, segments are generated so that each segment begins at a particular type of endpoint frame (e.g., a shot boundary).

In a third embodiment, the segmenting module 240 is combined with the encoding module 230 to quantize and segment the discontinuity data using a "moving window" approach. Here, for example, a first window of frames is quantized in time and a first fingerprint is obtained corresponding to the first window. The window then shifts by, for example, one frame, and the new window of frames (overlapping with the first window) is quantized to obtain a second fingerprint. Other variations of processes for obtaining fingerprints are also possible and will be apparent to those of ordinary skill in the art.

Figure 4:
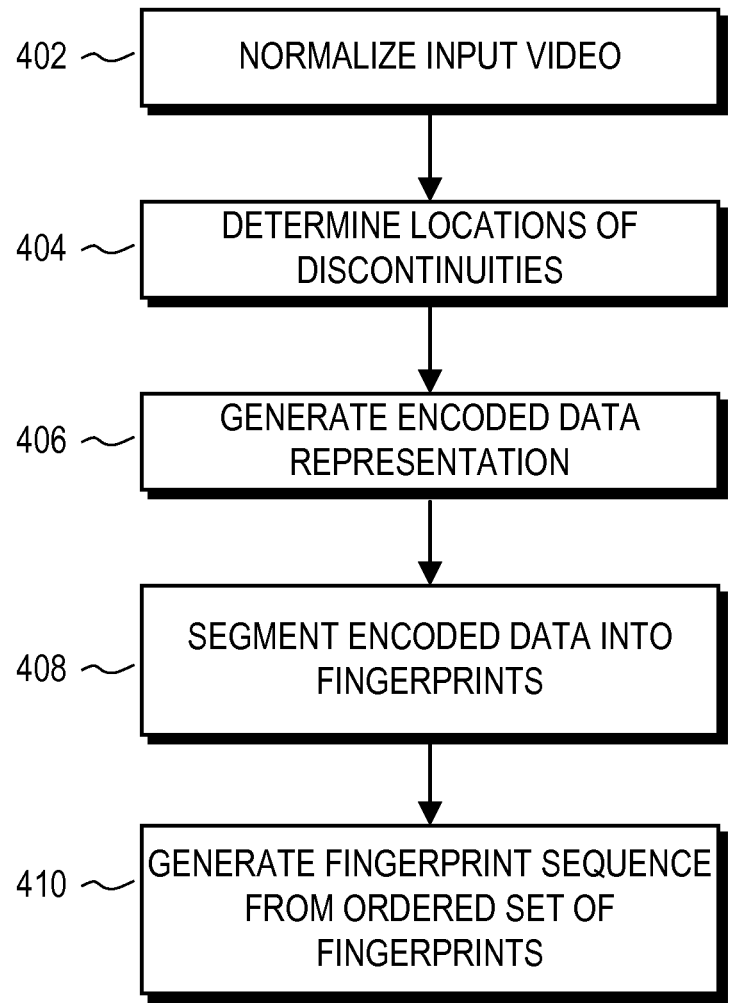
FIG. 4 is a flowchart illustrating a process for generating a video fingerprint sequence.
Figure 5:
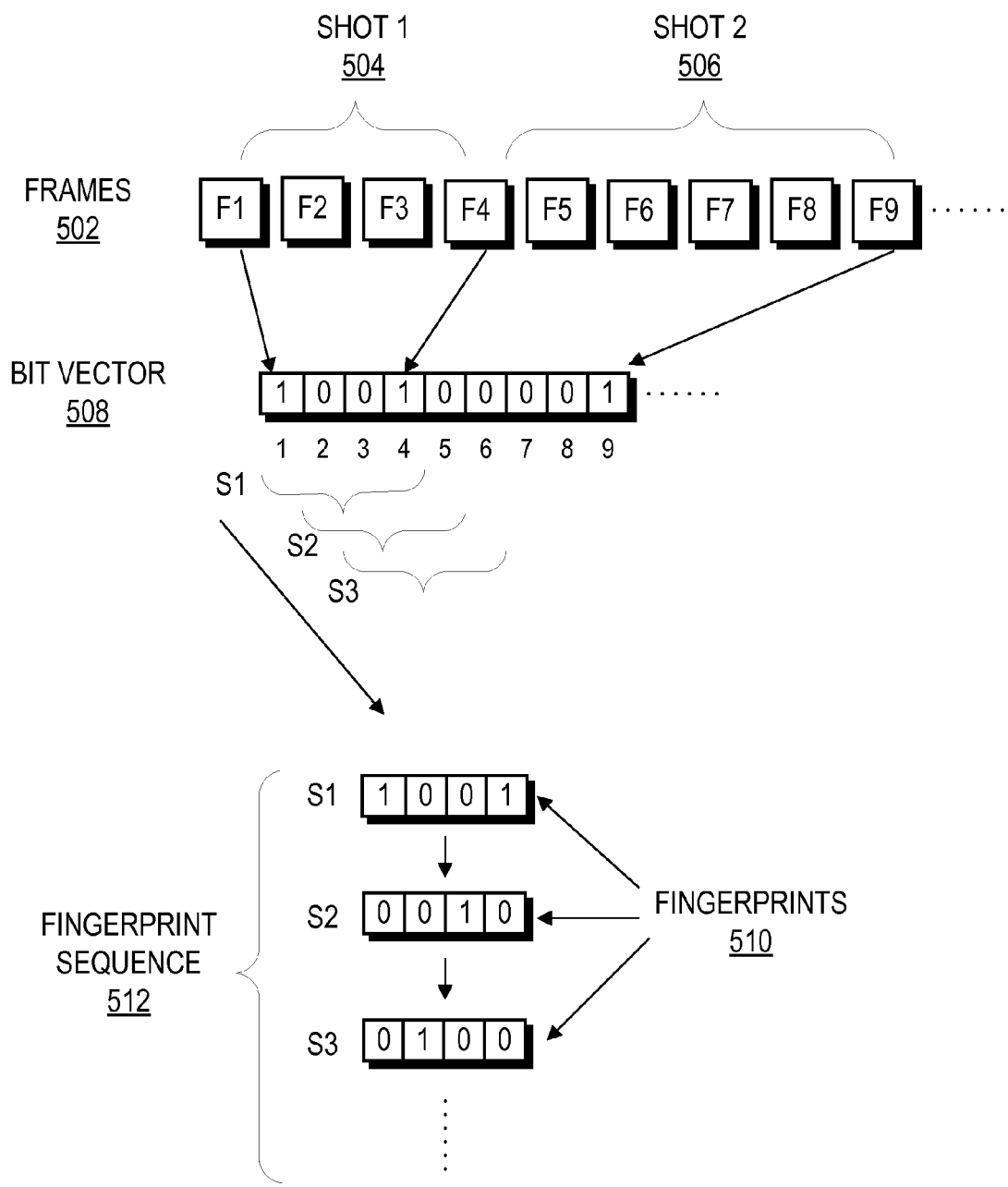
FIG. 5 is a diagram illustrating example results of a fingerprint generation process according to one embodiment.

Referring now to FIG. 4, a flowchart illustrates a process for generating a fingerprint sequence using the fingerprinting module 106. The process in FIG. 4 can be viewed in conjunction with FIG. 5 which graphically illustrates the intermediate results of the fingerprint generation process. For the purpose of illustration, only a limited number of frames are shown in FIG. 5.

The fingerprinting module 106 receives an input video and the normalization module 210 normalizes 402 the video to obtain input frames 502. The endpoint detection module 220 determines 404 locations of discontinuities. In the example of FIG. 5, the frame has a first shot 504 comprising frames F1-F4 and a second shot 506 comprising frames F5-F9. It is noted that only a few frames are shown per shot for the purpose of illustration only, and that an input video may typically contain many more frames per shot. In the example provided, the endpoint detection module 220 identifies frames F1, F4, and F9 as endpoint frames. Although the example of FIG. 5 illustrates only the detection of shot boundaries, the process can include detecting other video frame discontinuities, audio stream discontinuities, or both.

Based on detected shot boundaries and/or silent points, an encoded data representation (e.g., a bit vector) is generated 406 indicating the locations of discontinuities in the video frame sequence. In the example of FIG. 5 a bit vector 508 is used in which a "1" indicates a discontinuity and a "0" indicates no discontinuity. In other embodiments, different types of encodings can be used as previously described.

The encoded data (e.g., a bit vector 508) is segmented 408 into fingerprints. In the example of FIG. 5, the bit vector 508 is segmented into fingerprints 510 having a length of 4 and an offset of one frame between fingerprints. Although only three segments S1-S3 are shown, additional fingerprints 510 can be similarly obtained from the segmenting step 408. Furthermore, segments and/or fingerprints can be of different sizes (typically longer) than that illustrated.

A fingerprint sequence 512 is generated 410 for a video from the ordered set of fingerprints 510. The fingerprint sequence 512 can be compared to a reference fingerprint sequence by counting the number of differences between the bits in the respective sequences. This comparison provides a good indication of the similarity between the videos associated with the fingerprint sequences.

Figure 6:
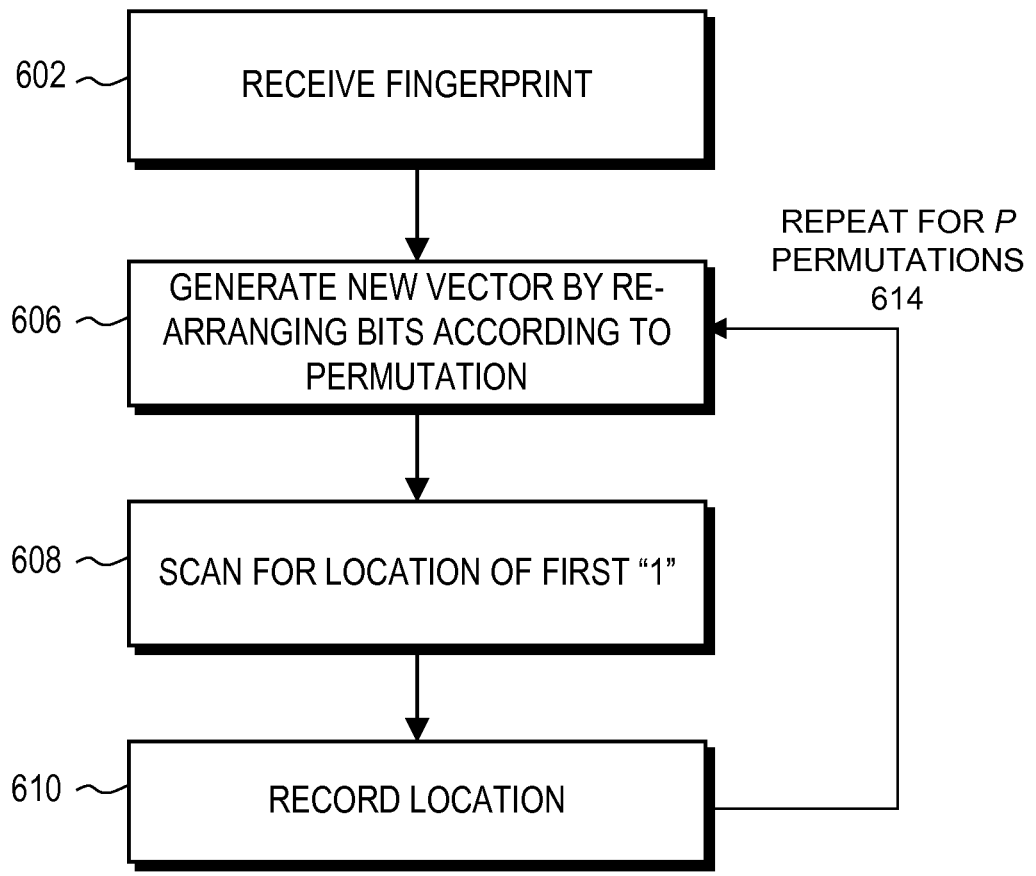
FIG. 6 is a flowchart illustrating a process for indexing video fingerprints.

In order to reduce the number of bit comparisons when comparing fingerprints to each other, the fingerprints are indexed by the indexing module 108. An example process for indexing uses a min-hash process as illustrated in FIG. 6. The min-hash process generates a "signature" for the video fingerprint by applying a set of P permutations to the bit values of the fingerprint. The signature contains fewer bits than the full fingerprint but retains most of the information in the associated fingerprint.

As described above, the video fingerprint is in the form of a bit vector that represents the shot boundary sequence for an individual segment. Generally, the indexing module applies a number P permutations to the bits of the fingerprint. Each permutation defines a bit re-arrangement (e.g., bit swap) of the bits of the fingerprint; the permutation may be a random permutation or algorithmic. The permutations are preferably defined beforehand, but once defined the permutations are fixed and always applied in the same order.

Referring to FIG. 6, the indexing module 108 receives 602 a fingerprint for a video segment. A new bit vector is generated 606 by re-arranging the bits according to a first permutation $P_1$. A scanning module scans 608 for the location of the first bit value of "1" in the re-arranged bit vector and records 610 this location to a location vector. This process of permutation and location recording repeats 614 for all P permutations. Thus, each received fingerprint will have the same set of P permutations applied in the same order. The output is a location vector having P values, with each value indicating a location of the first bit value of "1" in the underlying fingerprint after applying each permutation. This set of locations provides the signature for the fingerprint.

The min-hash process described above can be further combined with locality sensitive hashing. In locality sensitive hashing, each signature is divided into a number of signature blocks and each signature block is placed into a different hash table. For each entry in the hash tables, unique identifiers of any video segment that generates that particular signature block are stored with the corresponding signature block Variations on the indexing process can be used depending on the encoding scheme. For example, in an embodiment in which the fingerprints are encoded as a sequence of time offsets to the next endpoint frame, the min-hash step can be bypassed and the sequence of offsets used directly in the locality sensitive hashing step. Alternatively, the offsets can be re-encoded into a bit vector to which min-hash is applied.

Figure 7:
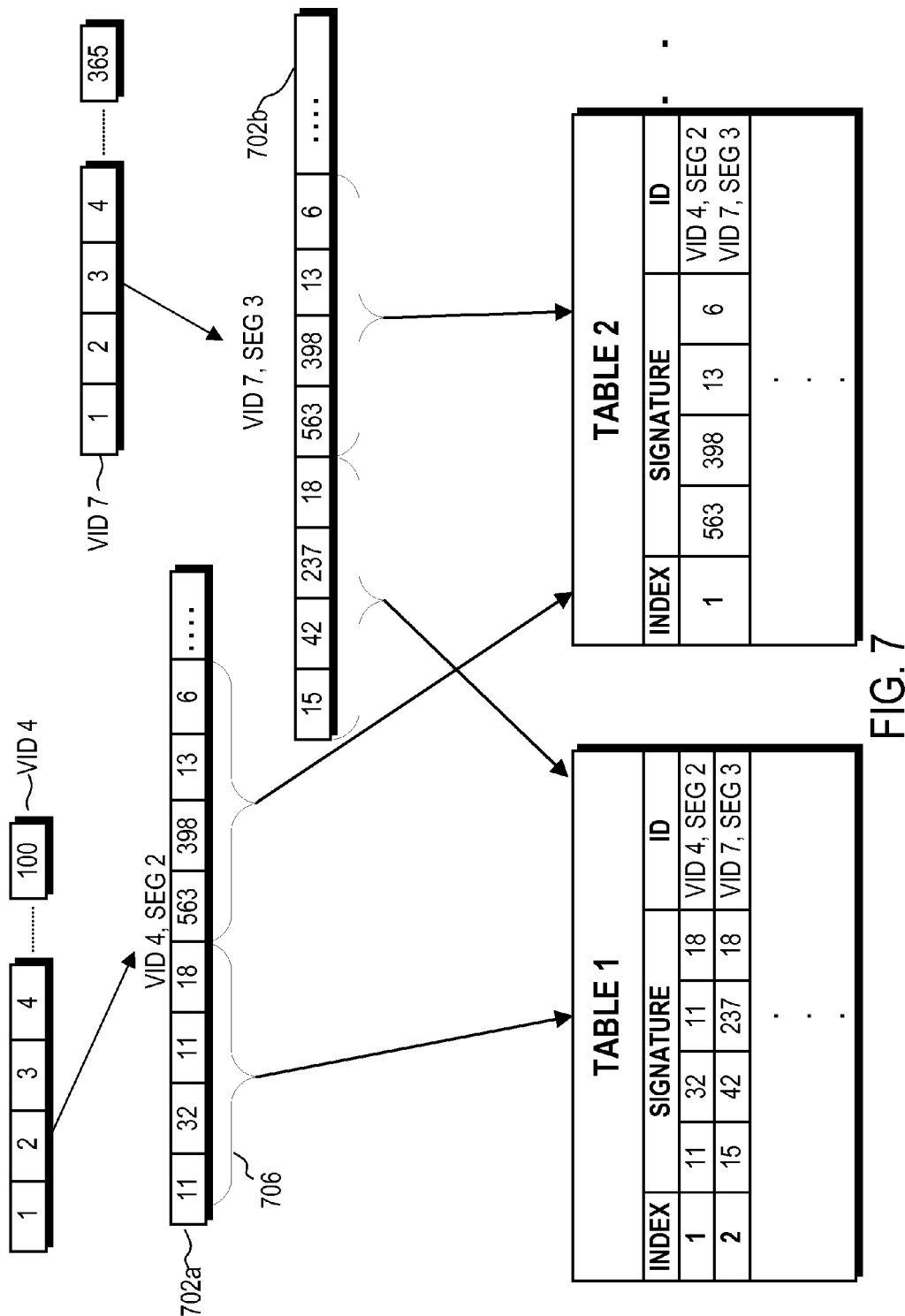
FIG. 7 illustrates an example of indexed video segments.

FIG. 7 illustrates an example of indexed fingerprints using the min-hash and locality sensitive hashing techniques described above. Two videos, VID 4 comprising 100 segments and VID 7 comprising 365 segments are shown. A first signature 702a corresponds to a first fingerprint of the second video segment of VID 4. The signature 702a is represented by a sequence of P locations (e.g., 11, 32, 11, 18 . . . ). The signature is broken into signature blocks 706 of four locations each. According to various embodiments, different sized signature blocks are used. A second signature 702b corresponds to the third video segment of VID 7. The first signature block in each signature 702 is mapped to table 1, the second signature block is mapped to table 2, and so on. The tables store each signature block and a unique identifier for all video segments that generated each particular signature block. The tables also associate an index number with each unique signature block representing an offset into the table, although the index number itself need not be explicitly stored. For example, table 1, index 1 corresponds to the signature block having the sequence 11, 32, 11, 18. In table 2, the signature block stored at index 1 corresponds to the sequence (563, 398, 13, 6). Because both VID 4 segment 2, and VID 7, segment 3 have this sequence as their second signature block, both segments are mapped to index 1. In practice, each video segment can be assigned a unique identifier, which is used in these tables in place of the tuple (video, segment).

Figure 8:
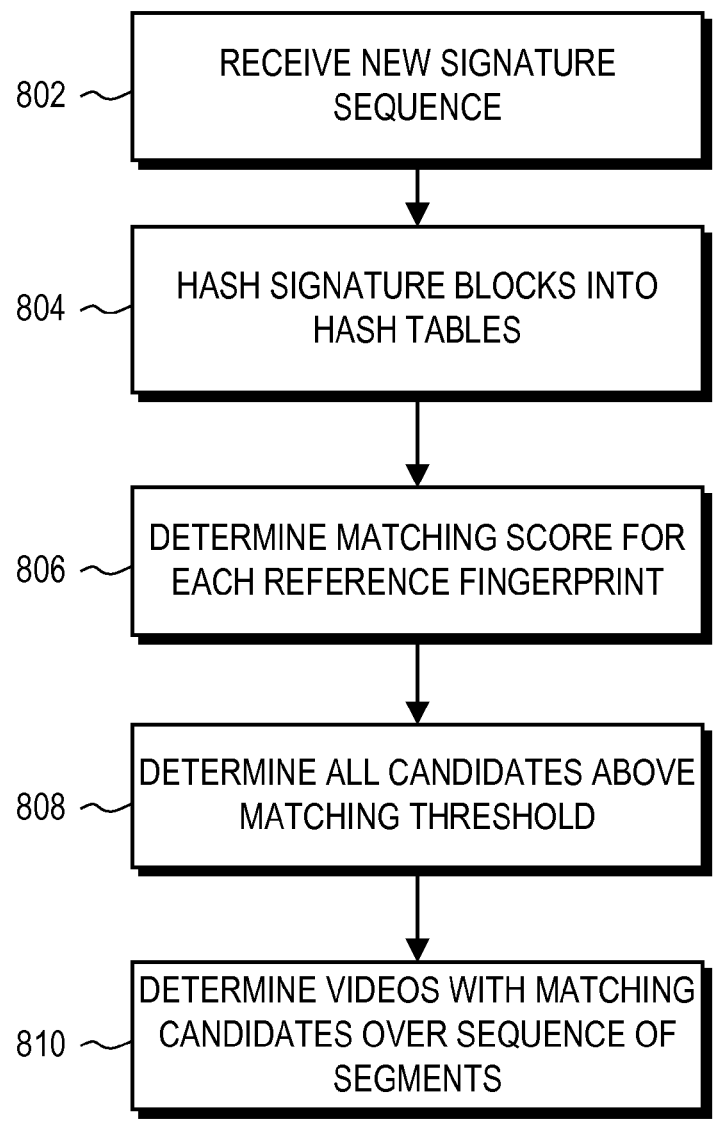
FIG. 8 is a flowchart illustrating a process for matching video fingerprints.

Once each video segment's signature is indexed for a collection of videos, the matching module 110 can be used to efficiently compare and match fingerprints of video files. Using the hash techniques described above, videos can be compared simply by comparing the index values of their signature blocks for each segment, rather than performing a bit-for-bit comparison of the entire fingerprint sequence. An example matching process is illustrated in FIG. 8.

In step 802, a signature sequence (corresponding to the ordered signatures of a fingerprint sequence) for an ingested video is received by the matching module 110. Each signature block of a first signature in the signature sequence is hashed 804 into the corresponding hash tables. For every matching signature block found in the table, a separate count is incremented for each unique video identifier associated with the matching signature block. Thus, each reference fingerprint maintains a separate count indicating the number of signature blocks of the reference fingerprint that match signature blocks of the first fingerprint of the ingest video. The counts are used to determine 806 a matching score between the first fingerprint of the ingest video and each reference fingerprint of each video segment in the reference database 112. The matching scores are compared against a threshold value to determine 808 all reference fingerprints having matching scores above the threshold. Reference fingerprints with matching scores above the threshold are designated as matching fingerprints. This process then repeats for each individual fingerprint of the fingerprint sequence of the ingest video.

Once all matching fingerprints are found for the fingerprints of the ingest video, matching is performed at the sequence level. In one method, the matching module 110 determines the reference video with the longest consecutive sequence of fingerprints that match the fingerprint sequence of the ingest video. Because each fingerprint corresponds to a time segment of video, this method determines a reference video that matches the ingest video over the longest consecutive time period.

Alternative sequence matching methods may also be used. In another example method, a fixed length window of time (e.g., 15 seconds) is designated for the ingest video. The fixed length window of time corresponds to a block of fingerprints in the fingerprint sequence of the ingest video. For a reference video having matching segments, time offsets are determined between each matching segment of the reference video and the corresponding segments of the ingest video. Each matching pair of segments casts a "vote" for a particular time offset. The votes are counted across all matching pairs and the reference window with the highest number of votes is designated as the best match.

The systems and methods described above enable indexing a video library using video fingerprints and matching video content based on structural characteristics of the video. This is particularly useful, for example, in finding and removing duplicate video content and preventing sharing of copyright protected content. Moreover, the methods can be performed automatically and are therefore more efficient and cost effective than conventional techniques. The present invention has been described in particular detail with respect to a limited number of embodiments. Those of skill in the art will appreciate that the invention may additionally be practiced in other embodiments. For example, although the invention has been described above as a fingerprinting and duplicate detection system and method for video files, the techniques can also be applied to other types of media files (e.g., audio files) in which discontinuities can be detected. The particular naming of the components, capitalization of terms, the attributes, data structures, or any other programming or structural aspect is not mandatory or significant, and the mechanisms that implement the invention or its features may have different names, formats, or protocols. Furthermore, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the feature of the present invention in terms of algorithms and symbolic representations of operations on information. These algorithmic descriptions and representations are the means used by those skilled in the arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method for fingerprinting an input video having a sequence of video frames, the method performed by a computer system, the method comprising:
   identifying, by the computer system, a plurality of discontinuities in features of audio-visual content of the input video, wherein the sequence of video frames includes frames associated with one or more associated discontinuities and frames not associated with discontinuities;
   generating, by the computer system, an encoded data representation representing the sequence of video frames, wherein the frames associated with the one or more associated discontinuities are represented by first values in the encoded data representation, and wherein frames not associated with the discontinuities are represented by second values in the encoded data representation, the second values different than the first values, and wherein the first values and the second values are arranged in a sequence in the encoded data representation corresponding to the sequence of video frames;
   segmenting, by the computer system, the encoded data representation;
   generating, by the computer system, a plurality of fingerprints, each fingerprint comprising an encoded data segment corresponding to a segment of the input video;
   indexing the plurality of fingerprints by:
      generating a signature for a fingerprint of the plurality of fingerprints according to a first hash process; and
      dividing the signature into a plurality of signature blocks, each signature block stored in a hash table according to a second hash process, wherein the first hash process and the second hash process are different; and
   storing the hash table to a computer readable storage medium.

2. The method of claim 1, wherein a first discontinuity of the plurality of discontinuities comprises a shot boundary in the sequence of video frames.

3. The method of claim 1, wherein identifying a plurality of discontinuities comprises analyzing depicted motion between the frames and determining an endpoint frame where the motion is at a peak.

4. The method of claim 1, wherein identifying a plurality of discontinuities comprises analyzing volume of an audio stream associated with the sequence of video frames and determining an endpoint frame where the volume is below a predetermined threshold volume.

5. The method of claim 1, further comprising normalizing the sequence of video frames by reducing at least one of frame size and color information.

6. The method of claim 1, wherein the signature is uniquely associated with the fingerprint and comprises fewer bits than the first fingerprint.

7. The method of claim 6, wherein the first hash process comprises:
- re-arranging bits of the fingerprint according to a predetermined number of pre-defined permutations; and
- storing a location of the first bit value of "1" in the re-arranged bits following each permutation.

8. The method of claim 1, further comprising:
- generating a fingerprint sequence comprising an ordered set of the plurality of fingerprints for the input video;
- searching a reference database for reference fingerprint sequences that match the fingerprint sequence for the input video; and
- determining at least one reference video corresponding to at least one matching reference fingerprint sequence.

9. The method of claim 8, further comprising removing a reference video corresponding to the at least one matching reference fingerprint sequence from a reference library storing the input video and the reference video.

10. A non-transitory computer-readable storage medium storing instructions for fingerprinting an input video having a sequence of video frames, the instructions when executed causing a processor to perform steps comprising:
- identifying a plurality of discontinuities in features of audio-visual content of the input video, wherein the sequence of video frames includes frames associated with one or more associated discontinuities and frames not associated with discontinuities;
- generating an encoded data representation representing the sequence of video frames, wherein the frames associated with the one or more associated discontinuities are represented by first values in the encoded data representation, and wherein frames not associated with the discontinuities are represented by second values in the encoded data representation, the second values different than the first values, and wherein the first values and the second values are arranged in a sequence in the encoded data representation corresponding to the sequence of video frames;
- segmenting, by the computer system, the encoded data representation;
- generating a plurality of fingerprints, each fingerprint comprising an encoded data segment corresponding to a segment of the input video;
- indexing the plurality of fingerprints by:
  - generating a signature for a fingerprint of the plurality of fingerprints according to a first hash process; and
  - dividing the signature into a plurality of signature blocks, each signature block stored in a hash table according to a second hash process, wherein the first hash process and the second hash process are different; and
- storing the hash table to a computer readable storage medium.

11. The non-transitory computer-readable storage medium of claim 10, wherein a first discontinuity of the plurality of discontinuities comprises a shot boundary in the sequence of video frames.

12. The non-transitory computer-readable storage medium of claim 10, wherein identifying a plurality of discontinuities comprises analyzing depicted motion between the frames and determining an endpoint frame where the motion is at a peak.

13. The non-transitory computer-readable storage medium of claim 10, wherein identifying a plurality of discontinuities comprises analyzing volume of an audio stream associated with the sequence of video frames and determining an endpoint frame where the volume is below a predetermined threshold volume.

14. The non-transitory computer-readable storage medium of claim 10, the instructions when executed by the processor further causing the processor to normalize the sequence of video frames by reducing at least one of frame size and color information.

15. The non-transitory computer-readable storage medium of claim 10, wherein the signature is uniquely associated with the fingerprint and comprises fewer bits than the fingerprint.

16. The non-transitory computer-readable storage medium of claim 15, wherein the first hash process comprises:
- re-arranging bits of the fingerprint according to a predetermined number of pre-defined permutations; and
- storing a location of the first bit value of "1" in the re-arranged bits following each permutation.

17. The non-transitory computer-readable storage medium of claim 10, the instructions when executed further causing the processor to perform steps of:
- generating a fingerprint sequence comprising an ordered set of the plurality of fingerprints for the input video;
- searching a reference database for reference fingerprint sequences that match the fingerprint sequence for the input video; and
- determining at least one reference video corresponding to at least one matching reference fingerprint sequence.

18. The transitory computer-readable storage medium of claim 17, the instructions when executed further causing the processor to perform a step of:
- removing a reference video corresponding to the at least one matching reference fingerprint sequence from a reference library storing the input video and the reference video.

19. A system for fingerprinting an input video having a sequence of video frames, the system comprising:
- a non-transitory computer-readable medium storing executable instructions; and
- a processor configured to execute the instructions to perform steps comprising:
  - identifying a plurality of discontinuities in features of audio-visual content of the input video, wherein the sequence of video frames includes frames associated with one or more associated discontinuities and frames not associated with discontinuities;
  - generating an encoded data representation representing the sequence of video frames, wherein the frames associated with the one or more associated discontinuities are represented by first values in the encoded data representation, and wherein frames not associated with the discontinuities are represented by second values in the encoded data representation, the second values different than the first values, and wherein the first values and the second values are arranged in a sequence in the encoded data representation corresponding to the sequence of video frames;
segmenting, by the computer system, the encoded data representation;
generating a plurality of fingerprints, each fingerprint comprising an encoded data segment corresponding to a segment of the input video;
indexing the plurality of fingerprints by:
  generating a signature for a fingerprint of the plurality of fingerprints according to a first hash process; and
  dividing the signature into a plurality of signature blocks, each signature block stored in a hash table according to a second hash process, wherein the first hash process and the second hash process are different; and
storing the hash table to a computer readable storage medium.

* * * * *

UNITED STATES PATENT AND TRADEMARK OFFICE
CERTIFICATE OF CORRECTION

PATENT NO. : 9,135,674 B1
APPLICATION NO. : 14/092515
DATED : September 15, 2015
INVENTOR(S) : Jay Yagnik et al.

It is certified that error appears in the above-identified patent and that said Letters Patent is hereby corrected as shown below:

In the Claims:
Column 14, line 41, replace "The transitory computer-readable storage medium of," with
--The non-transitory computer-readable storage medium of--.

Signed and Sealed this
Nineteenth Day of July, 2016

Michelle K. Lee
*Director of the United States Patent and Trademark Office*